United States Patent [19]

Satake et al.

[11] Patent Number: 4,955,550
[45] Date of Patent: Sep. 11, 1990

[54] QUANTITATIVE FEEDING APPARATUS USABLE FOR PULVERIZED AND/OR GRANULAR MATERIAL AND BATCH TYPE MULTI-COLORED AUTOMATIC FEEDING APPARATUS

[75] Inventors: Hideo Satake, Toyota; Hideo Shimizu; Hozumi Tanaka, both of Tokyo, all of Japan

[73] Assignees: Toyota Jidosha Kabushiki Kaisha, Aichi; Toyo Ink Mfg. Co., Ltd., Tokyo, both of Japan

[21] Appl. No.: 266,906

[22] Filed: Nov. 3, 1988

[30] Foreign Application Priority Data

Nov. 7, 1987 [JP] Japan .................................. 62-281773
Jun. 13, 1988 [JP] Japan .................................. 63-145063

[51] Int. Cl.$^5$ ............................................ B02C 19/00
[52] U.S. Cl. .................................. 241/101.4; 241/38; 241/41; 222/14; 222/52
[58] Field of Search ............ 241/38, 41, 101.4, 186 R, 241/186 A; 222/14, 52, 55

[56] References Cited

U.S. PATENT DOCUMENTS 2,753,121 7/1956 Elfenbein .......................... 241/38 X
4,344,579 8/1982 Morita et al. ................ 241/101 B X
4,467,969 8/1984 Godfrey et al. ............. 241/101.4 X

FOREIGN PATENT DOCUMENTS

510362 10/1945 Canada .................................. 241/38
110411 6/1985 Japan .

Primary Examiner—Timothy V. Eley
Attorney, Agent, or Firm—Martin A. Farber

[57] ABSTRACT

A quantitative feeding apparatus usable for pulverized and/or granular material, a multi-colored automatic feeding apparatus in which the material to be handled is fed in the form of a master batch while the quantitative feeding apparatus is used therefor and a runner recycling apparatus are provided. At every time when the kind of color is to be changed to another one, it is necessary that the quantitative feeding apparatus using the master batch therefor is heretofore disassembled for the purpose of cleaning with the result that a number of manhours are consumed for cleaning operation. In view of the foregoing problem, a plurality of cleaning nozzles directed toward the upper feeding port of the quantitative feeding apparatus, the feeder and the bottom discharging part are arranged for the purpose of cleaning whereby automatic cleaning can be achieved satisfactorily.

1 Claim, 6 Drawing Sheets

QUANTITATIVE FEEDING APPARATUS USABLE FOR PULVERIZED AND/OR GRANULAR MATERIAL AND BATCH TYPE MULTI-COLORED AUTOMATIC FEEDING APPARATUS

BACKGROUND OF THE INVENTION

1. Field of the Invention

The present invention relates to a quantitative feeding apparatus usable for pulverized and/or granular material wherein an amount of pulverized and/or granular material to be supplemented is automatically controlled by measuring a predetermined amount of pulverized and/or granular material and the predetermined amount of pulverized and/or granular material is then mechanically fed to the outside. Further, the present invention relates to a master batch type multi-colored feeding apparatus using the quantitative feeding apparatus wherein a master batch comprising a number of colored pellets is fed to the lower part of a hopper for a mixer so that the colored plastic material is molded in a molding machine. In addition, the present invention relates to a runner recycling apparatus usable for reusing runners produced during a period in which injection molding is achieved using the quantitative feeding apparatus, more particularly, to a runner recycling apparatus which assures that changing of the kind of color or material to another one can be quickly executed.

2. Description of the Prior Art

Hitherto, a quantitative feeding apparatus for feeding a predetermined amount of pulverized and/or granular material has been used in a variety of industrial fields. It is typically used, for instance, for a pulverized material molding machine, a master batch type multi-colored automatic feeding apparatus usable for a plastic molding machine, a runner recycling apparatus or the like.

Figure 8:
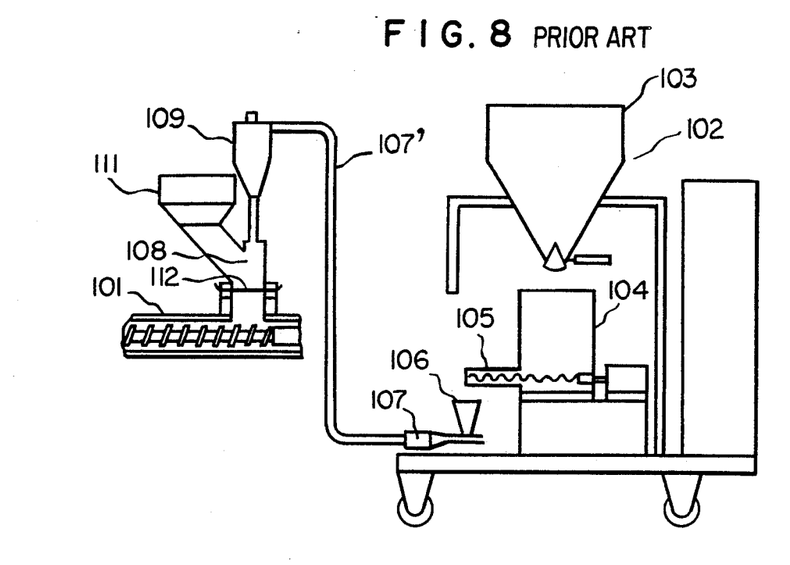
FIG. 8 is a schematic view illustrating construction of a conventional multi-colored feeding apparatus.

FIG. 8 schematically illustrates, by way of an example, a multi-colored feeding apparatus for a plastic molding machine in which a quantitative feeding apparatus usable for pulverized and/or granular material is incorporated.

Specifically, referring first to FIG. 8, reference numeral 101 designates a molding machine which is associated with a multi-colored feeding apparatus 102. In the multi-colored feeding apparatus 102, a master batch is supplemented to a quantitative feeding apparatus 104 from a master batch storage hopper 103. The quantitative feeding apparatus 104 is adapted to feed a predetermined amount of master batch to a master batch receiving hopper 106 by operating a feeder 105. The master batch is delivered to a mixer 108 from the master batch receiving hopper 106 via a piping 107' by means of a pneumatic conveyor 107 so that it is mixed with natural resin delivered from a natural resin hopper 111 in the mixer 108. Thereafter, a raw material thus prepared is fed to the molding machine 101 via a raw material feeding port 112.

As to the quantitative feeding apparatus used in that way, many types are well known such as a belt feeder type, a table feeder type, a rotary feeder type, a vibrative feeder type, a screw feeder type, a spring feeder type or the like.

On the other hand, a step of mixing in accordance with the master batch system during plastic molding operation is practiced in such a manner that natural resin and master batch are mixed with each other in a batch type using a mixer such as tumbler, Henschel mixer or the like and thereafter a mixture thus prepared is introduced into a hopper for the molding machine. However, in the case where mixing is achieved in a batch type, a period of several hours is required for cleaning the mixer used for practicing the above-described mixing system when the kind of color is changed to another one, which provides a significant hindrance which has an adverse effect on smooth progress of the steps. In addition, separation of natural resin from the master batch takes place due to static electricity generated by vibrating or flowing of material in the hopper for the molding machine. This leads to the drawback that a final product in which additives such as pigment, dispersant or the like in the master batch are uniformly distributed can not be obtained.

To improve the above-described method or mixing in a batch type, automation has been carried out with respect to measuring and mixing and various systems have been put in practical use.

Now, these systems will be described with reference to drawings which schematically illustrate apparatus which are employed at present.

Figure 9:
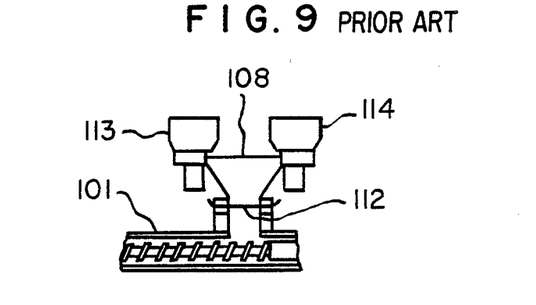
FIG. 9 is a schematic view illustrating construction of other conventional multi-colored feeding apparatus.
Figure 10:
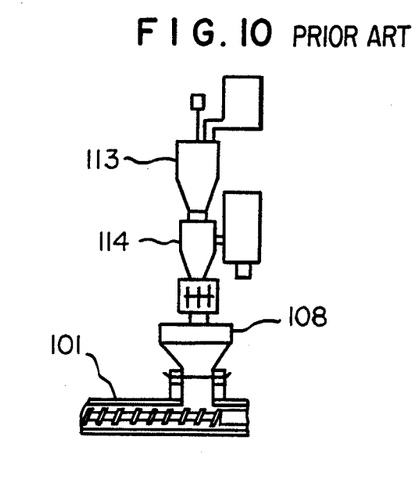
FIG. 10 is a schematic view illustrating construction of another conventional multi-colored feeding apparatus.
Figure 11:
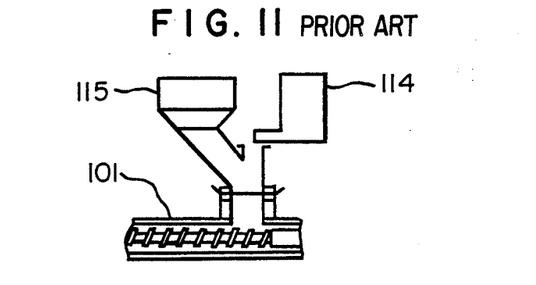
FIG. 11 is a schematic illustrating construction of further conventional multi-colored feeding apparatus.

One of them is an apparatus as shown in FIG. 9 which is so constructed that a mixer 108 is disposed above a raw material feeding port 112 for a molding machine 101 and the mixer 108 is separately provided with a quantitative feeding apparatus 113 usable for natural resin and a quantitative feeding apparatus 114 for master batch. The other one is an apparatus as shown in FIG. 10 which is so constructed that a mixer 108, a quantitative feeding apparatus 114 usable for master batch and a quantitative feeding apparatus 13 usable for natural resin are disposed one above another. However, since each apparatus is constructed in a batch type and they are arranged above the molding machine, disassembling and cleaning are very troublesome when the kind of color is to be changed to another one and moreover an occurrence of separation in the hopper for the molding machine as mentioned above can not be prevented. In recent years, there has been raised a requirement for increasing a concentration of pigment in the master batch to such an extent that a weight ratio of master batch to be added to natural resin is set lower than 3/100. Consequently, a correct mixing accuracy can not be maintained as far as a micro part in the mixture is concerned. In addition, an apparatus as shown in FIG. 11 is known which is so constructed that a quantitative feeding apparatus 114 usable for master batch is provided above a molding machine 101 and the master batch is quantitatively fed to a raw material feeding part for the molding machine so that it is mixed with natural resin which is fed from a hopper 115 separately disposed for the molding machine. However, this type of apparatus has also a drawback that disassembling and cleaning are inconveniently achieved because the quantitative feeding apparatus is arranged above the molding machine. Additionally, in a case where a method of measuring a master batch is of volumetric type in connection with the examples shown in FIGS. 9, 10 and 11, the quantitative feeding apparatus has drawbacks that such a malfunction that incorrect pellets are contained in the master batch or no pellet is fed for an unidentified reason can not be detected and any fluctuation in apparent density of the master batch can not be compensated satisfactorily. Accordingly, the drawback inherent in the volumetric type can be eliminated by allowing the method of measuring to be changed to a weight type but arrangement of a new apparatus on the mixer renders the quantitative feeding apparatus more complicated. Thus, the more complicated the quantitative feeding apparatus, the more troublesome are disassembling and cleaning operations.

Figure 12:
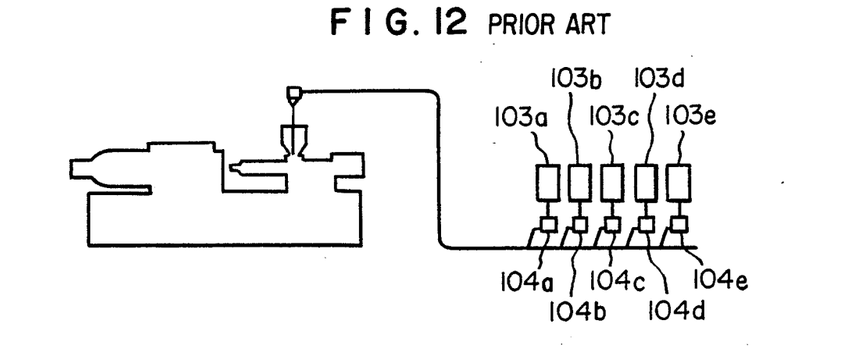
FIG. 12 is a schematic view illustrating construction of still another conventional multi-colored feeding apparatus.

To overcome the problems appearing in automatic feeding of a master batch, the inventor proposed a master batch type automatic feeding apparatus as disclosed in an official gazette of Japanese Laid-Open Patent No. 110411/1985. As shown in FIG. 8, the proposed master batch type automatic feeding apparatus comprises a master batch storage hopper 103, a quantitative feeding apparatus 104, a pneumatic conveyor 107, a cyclone 109 and a mixer 108. Further, as shown in FIG. 12, to assure that various kinds of molded products can be produced using different master batches, the same number of master batch storage hoppers 103a to 103e and quantitative feeding apparatus 104a to 104e as the number of kinds of materials are provided so that an arbitrary master batch can be fed to the molding machine merely by shifting switches. By doing so, separation of natural resin from the master batch in the hopper for molding machine does not take place. Accordingly, molded products to be rejected are not produced and thereby it becomes possible to produce molded products excellent in quality and stability. Additionally, when the kind of master batch or color is to be changed to another one, time and manhours required for cleaning the apparatus can be minimized whereby a master batch type automatic feeding apparatus which is very effective in production with many kinds and small quantity can be provided.

With respect to the quantitative feeding apparatus, a single quantitative feeding apparatus is hitherto used for the purpose of feeding just a single kind of raw material. However, in recent years, there is a tendency for production to be achieved in a fashion of many kinds and small quantity while a minimized amount of inventory is maintained. This causes a single quantitative feeding apparatus to be used for feeding many kinds of materials after disassembling and cleaning it, and a time interval required for changing the kind of material to another one tends to be shortened gradually.

Accordingly, properties of the quantitative feeding apparatus relating to disassembling and cleaning thereof have a significant effect on productivity. As to the kind of conventionally used quantitative feeding apparatus, there are known many kinds or types such as a belt feeder type, a table feeder type, a rotary feeder type, a vibrative feeder type, a screw feeder type, a spring feeder type or the like and each of them is properly used dependent on their utilization fields. However, a problem is that it is difficult to clean them without disassembling with the exception of the belt feeder type and the vibrative feeder type. The vibrative feeder type quantitative feeding apparatus is excellent in cleanability but in view of the current tendency that the quantitative feeding apparatus is changed to a weight controlling type, vibration is problem when its weight is measured or detected.

When the belt feeder type quantitative feeding apparatus is employed, it is very simple and easy to clean its surface. Accordingly, it is advantageous when granular material is handled but in a case where pulverized material is handled, it is difficult to completely clean the inside of a belt or the dirty interior of a closed belt.

With respect to the quantitative feeding apparatus having another type of feeder incorporated therein, it is possible to control its weight but it is impossible to clean it without disassembling. Moreover, this type of quantitative feeding apparatus which is compact in structure is not known.

Next, with respect to the master batch type automatic feeding apparatus, there is a need for providing the same number of quantitative feeding apparatus as the number of kinds of materials to be handled, in order to product various kinds of molded products using different master batches. Accordingly, the apparatus offers significant drawbacks in that the apparatus is manufactured at an expensive cost and a wide space is required for installation of the apparatus.

Figure 13:
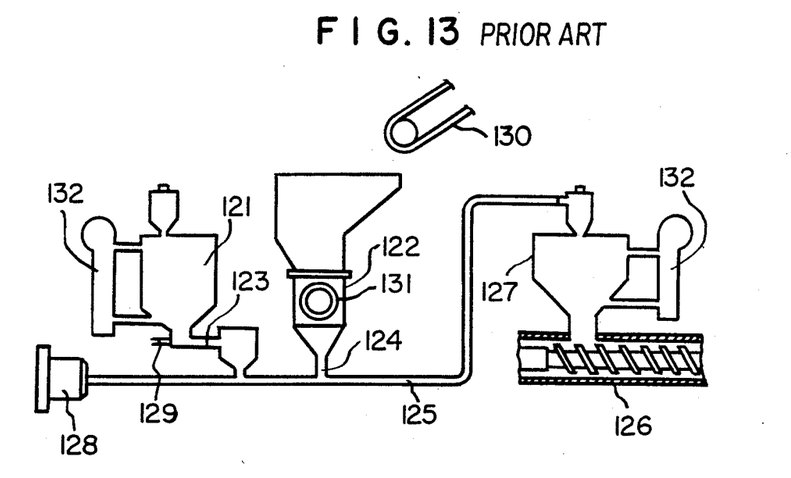
FIG. 13 is a schematic view illustrating construction of a conventional runner recycling apparatus.

As another example relative to the prior art, FIG. 13 schematically illustrates a runner recycling apparatus usable for a plastic molding machine, in which a quantitative feeding apparatus operable for pulverized and/or granular material is incorporated.

When plastic products are produced by employing an injection molding method, runners generated during injection molding operation are not thrown away as waste material but they are reused for the purpose of reducing production cost. This type of production system has been widely employed. Prior to reusing runners, they are crushed so that crushed runners are fed to a molding machine after they are mixed with new material in the form of pellet or powder. To this end, various kinds of apparatus have been hitherto put into practical use. For instance, an apparatus as shown in FIG. 13 is so constructed that a hopper 121 in which new material is stored and a crusher 122 for crushing runners are arranged in a side-by-side relationship, the hopper 121 and the crusher 122 are communicated with a piping 125 having a large diameter via a new material feeding port 123 and a crushed runner feeding port 124 and the one end of the piping 125 is connected to a hopper 127 located above a molding machine 126 while the other end of the same is connected to a blower 128. The new material is measured at every shot with the use of an air nozzle 129 disposed below the hopper 121 and it is then delivered to the piping 125 via the feeding port 123. On the other hand, runners conveyed by a conveyor 130 are introduced into the interior of a crusher 122, they are crushed by a plurality of crushing blades 131 in the crusher 122 and thereafter they are delivered to the piping 125 via the feeding port 124. New material and the crushed runner delivered into the piping 125 are mixed with each other while they are transferred through the piping 125 by operating the blower 128. Finally, a mixture thus prepared is fed to the hopper 127 disposed above the molding machine 126. Incidentally, reference numeral 132 designates driers which are disposed by the side of the hoppers 121 and 127.

Figure 14:
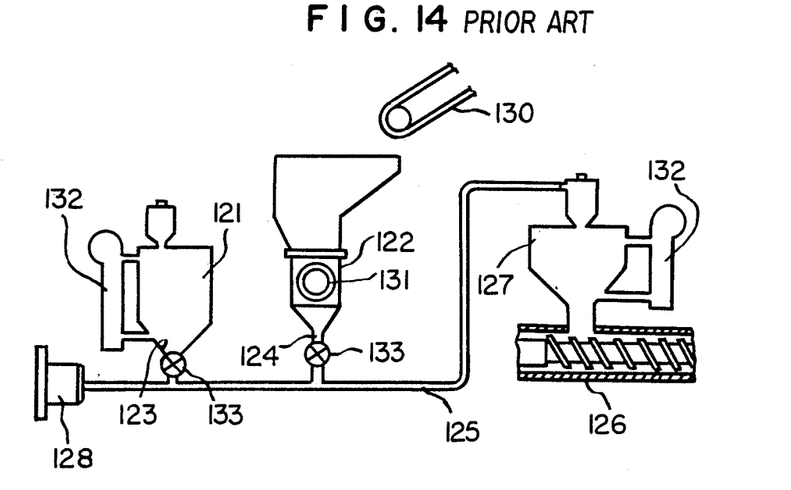
FIG. 14 is a schematic view illustrating construction of another conventional runner recycling apparatus.

On the other hand, a recycling apparatus as shown in FIG. 14 is similar to that in FIG. 13 with the exception that volumetric type measuring means 133 in the form of a rotary valve or the like is attached to each of the feeding port 123 for the new material hopper 121 and the feeding port 124 for the crusher 122. When new material and the crushed runner are delivered to the piping 125, they are measured by the measuring means 133.

As is apparent from the above description, each of the conventional runner recycling apparatus is commonly constructed such that the crusher 122 is provided with the crushed runner feeding port 124 at its lowermost end and thereby crushed runners which fall down under the effect of their natural gravity force are collected above the feeding port 124. With such construction, when the kind of color or material is to be changed to another one, it is necessary that the interior of the crusher 122 is cleaned after the feeding port 124 is disconnected from the piping 125 resulting in a problem of degraded operative properties arising. Particularly, in a case where measuring means 133 is disposed for the purpose of measurement (see FIG. 14), there is a need for carefully cleaning the measuring means 133 after the latter is disassembled. This leads to a problem that operative properties are degraded further.

In addition, due to a requirement that materials are mixed together in the piping 125 when the conventional runner recycling apparatus is employed, the piping 125 having a large diameter and the blower 128 designed in larger dimensions are required. Besides this, to assure that mixing is effected sufficiently in the piping, a length of the piping should be elongated. Thus, there arises another problem that a wide space required for installation of the piping should be reserved.

SUMMARY OF THE INVENTION

The present invention has been made with the foregoing background in mind and its object resides in providing a quantitative feeding apparatus usable for pulverized and/or granular material which assures that automatic cleaning is easily and reliably achieved and which assures that the kind of material to be handled can be changed to another one within a very short period of time only with the use of a single quantitative feeding apparatus after the latter is automatically cleaned merely by so-called button controlling without any necessity for manual operation.

Another object of the present invention is to provide a quantitative feeding apparatus which requires a small space for its installation and which can be manufactured at an inexpensive cost.

Another object of the present invention is to provide a master batch type automatic feeding apparatus which assures that changing of the kind of material to be handled, particularly, the kind of color to another one can be very simply achieved during a period of production in many kinds and small quantity when colored products are produced after natural resin and master batch are mixed and fused together for a molding machine such as an injection molding machine, extruder or the like, while a quality is stabilized among the products.

Further another object of the present invention is to provide a master batch type anutomatic feeding apparatus which requires a small space for its installation and which can be manufactured at an inexpensive cost.

Still further another object of the present invention is to provide a runner recycling apparatus of the type including a crusher and a quantitative feeding apparatus arranged one above another in an integral structure and a mixer disposed above a molding machine for mixing the crushed runner with new material, which assures that the interior of the runner recycling apparatus is quickly cleaned when the kind of color or material is to be changed to another one.

To accomplish the above objects, there is provided in accordance with one aspect of the present invention a quantitative feeding apparatus usable for pulverized and/or granular material in which an amount of pulverized and/or granular material to be supplemented to a barrel portion is automatically controlled by measuring a predetermined amount of pulverized and/or granular material and the predetermined amount of pulverized and/or granular material is then mechanically fed from the barrel portion, wherein a supplementing port through which the pulverized and/or granular material is supplemented is provided on the upper end of the barrel portion and a discharging portion through which the pulverized and/or granular material is discharged is provided on the bottom part of the barrel portion and wherein a plurality of cleaning nozzles are provided for the purpose of washing the supplementing port, the feeding portion and the discharging portion.

Further, there is provided in accordance with other aspect of the present invention a master batch type multi-colored automatic feeding apparatus in which an amount of master batch to be supplemented to a barrel portion of a quantitative feeding apparatus is automatically controlled by measuring a predetermined amount of master batch to be stored in a plurality of master batch storage hoppers and the predetermined amount of master batch is mechanically fed from the barrel portion, wherein the apparatus includes a pneumatic conveyor for conveying the master batch to be fed from the quantitative feeding apparatus to a molding machine, a separator disposed above the molding machine to separate air from solid material, a mixer including a raw material feeding portion for the molding machine in which the master batch which has fallen down after completion of separation of air from solid material is mixed with a natural resin and selecting and returning means for selecting the kind of master batch discharged from a discharging portion on the bottom part of the quantitative feeding apparatus to be returned to the same kind of hopper among the plural storage hoppers and returning it thereto, wherein a supplementing port through which the master batch is supplemented is provided on the upper end of the barrel portion, a feeding portion for feeding the master batch therethrough is provided at an intermediate part of the barrel portion and a discharging portion through which the master batch is discharged is provided on the bottom part of the barrel portion of the quantitative feeding apparatus and wherein a plurality of cleaning nozzles are provided for the purpose of washing the supplementing port, the feeding portion and the discharging portion.

Furthermore, there is provided in accordance with another aspect of the present invention a runner recycling apparatus, wherein a crusher is provided downwardly of a runner introducing chute, a quantitative feeding apparatus having a feeder for quantitatively feeding crushed runner incorporated therein is provided downwardly of the crusher, the quantitative feeding apparatus being formed with a feeding port located in alignment with the feeder, and a discharging port through which the crushed runner is discharged is formed on the bottom part of the quantitative feeding apparatus, wherein a plurality of cleaning nozzles directed toward the interior of the crusher and the interior of the quantitative feeding apparatus are arranged in the vicinity of the runner recycling apparatus and wherein a mixer in which the crushed runner and new material are mixed with each other is provided upwardly of a molding machine, the mixer being connected to the feeding port of the quantitative feeding apparatus via a piping.

These and other objects, features and advantages of the present invention will become readily apparent from reading of the following description which has made in conjunction with the accompanying drawings.

DESCRIPTION OF THE PREFERRED EMBODIMENTS

Now, the present invention will be described in a greater detail hereunder with reference to the accompanying drawings which illustrate preferred embodiments thereof.

Figure 1:
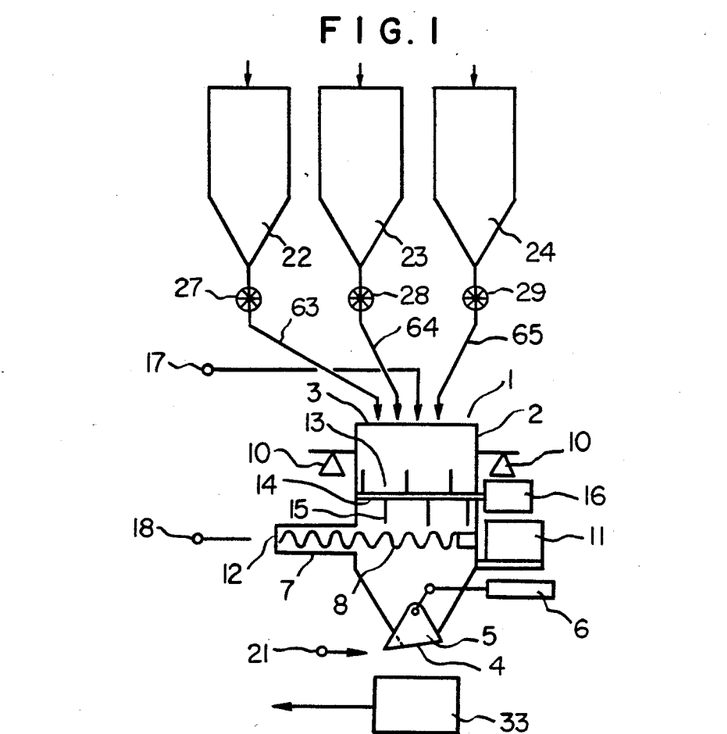
FIG. 1 is a schematic view illustrating construction of a quantitative feeding apparatus according to the present invention.

In FIG. 1, reference numeral 1 designates a quantitative feeding apparatus which includes a barrel portion 2. As is apparent from the drawing, the lower part of the barrel portion 2 is tapered downwardly. The barrel portion 2 may be designed in a cylindrical configuration. To assure that a bottom discharging device 5 is compact in structure, however, it is preferable for its lower end part including the surrounding region to be tapered downwardly instead of a cylindrical configuration. The barrel portion 2 is provided with a supplementing port 3 at its upper end, while it is provided with a discharging port 4 at its lower end. The discharging port 4 is adapted to open and close by actuating the bottom discharging device 5. This bottom discharging device 5 is energized by a pneumatic cylinder 6. The barrel portion 2 is supported by a weight detector 10. Besides the weight type measuring means, volumetric type measuring means is employable as means for measuring a quantity of pulverized and/or granular material (hereinafter referred to simply as material for the purpose of simplication) but in the light of accuracy and reliability of measurement it is preferable to employ the weight type measuring means. The barrel portion 2 further includes a feeding portion 7 at its intermediate part through which the material is fed to outside equipment, for instance, a molding machine. The feeding portion 7 is equipped with a feeder 8 adapted to be driven by a motor 11 so that the material is fed through a feeding port 12 at the foremost end of the feeding portion 7.

As to the feeder 8, a screw feeder, a belt feeder, a table feeder, a spring feeder, pneumatic feeder or the like may be used but it is preferable to employ the spring feeder when dischargeability and cleanability relative to the material to be discharged through the bottom of the barrel portion 2 are taken into consideration.

As required, the barrel portion 2 is provided with a bridge breaker 13. Specifically, in a case where material which is liable to exhibit a tendency of bridging is to be handled, the bridge breaker 13 is accommodated in the barrel portion 2. The bridge breaker 13 is such that a plurality of agitating blades 15 are secured to a shaft 14 adapted to be driven by a motor 16.

It is particularly important that a cleaning nozzle 17 directed toward the supplementing port 3 on the upper end of the barrel portion 2 is provided, a cleaning nozzle 18 directed toward the feeding portion 7 is provided and a cleaning nozzle 21 directed toward the discharging port 4 is provided in order to assure that (the supplementing port 3 including its surrounding region, the feeding portion 7 including its surrounding region and the discharging port 4 including its surrounding region are washed by these cleaning nozzles 17, 18 and 21, respectively.)

Three kinds of materials received in hoppers 22, 23 and 24 are supplemented into the barrel portion 2 therefrom via supplementing devices 27, 28 and 29. In addition, a receptacle 33 in which discharged material is received is disposed downwardly of the bottom discharging device 5. A system for supplementing materials from the hoppers 22 to 24 to the quantitatively feeding apparatus 1 may be practiced by operating feeders such as a screw feeder, rotary feeder, belt feeder or the like or opening and closing cut gates. Particularly, with respect to granular material to be handled, it is preferably to employ pneumatic conveyance with the use of an ejector due tot he fact that there is a need of disposing storage tanks having feeders or cut gates attached thereto above the quantitatively feeding apparatus 1, there are few degrees freedom of designing, the apparatus is complicated in structure and a wide space is required therefor. The ejector mechanism is such that granular material is sucked from the hoppers 22 to 24 using compressed air fed from a compressor (not shown) and it is then ejected into pipings 63 to 65. As a commerically available product, an ejecting mechanism manufactured and sold under a brand name of breath rider by Breath Co., Ltd. is recommendable. A conventional blower may be employed but in view of the space required for installation, the above-noted breath rider is preferably employable.

Next, descripotion will be made below with reference to FIG. 2 as to construction of a master batch type multi-colored automatic feeding apparatus using the above-described quantitative feeding apparatus.

Figure 2:
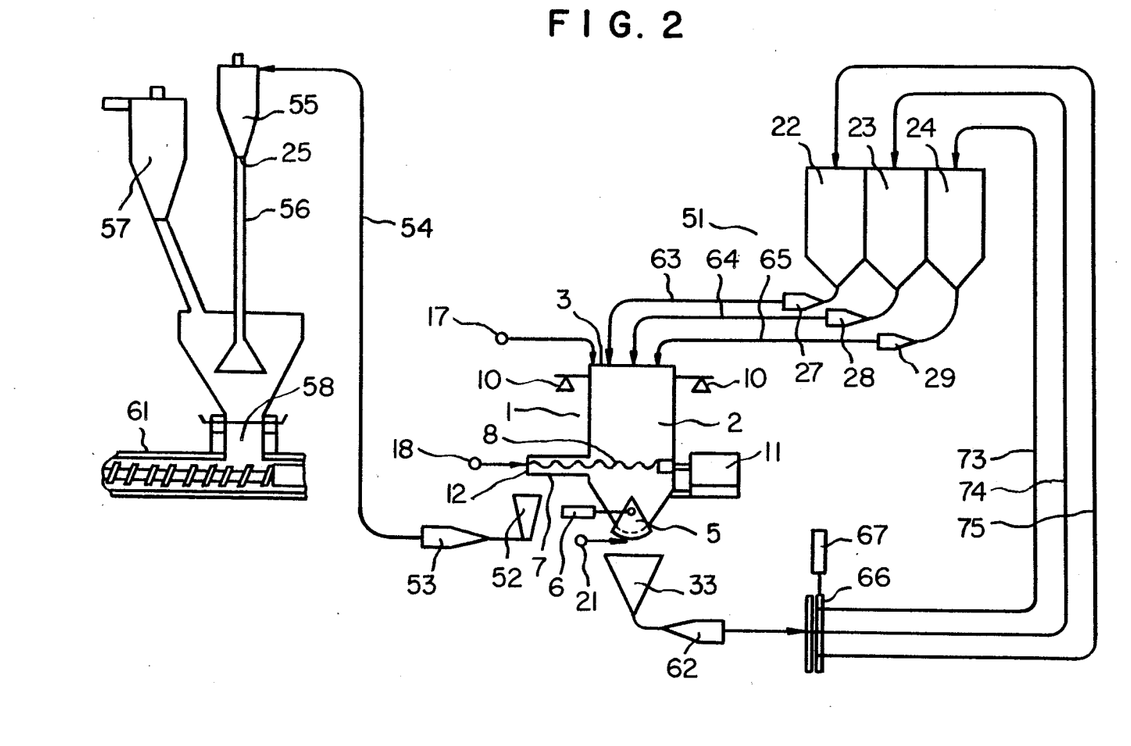
FIG. 2 is a schematic view illustrating construction of a multi-colored automatic feeding apparatus according to the present invention.

In FIG. 2, reference numeral 51 generally designates a multi-colored automatic feeding apparatus. The multi-colored automatic feeding apparatus 51 includes a quantitative feeding apparatus 1 of which feeding portion 7 has a feeding port 12 located in vertical alignment with a hopper 52 which in turn is connected to a cyclone 55 via a pneumatic conveyor (ejector mechanism) and a piping 54, and an outlet piping extending downwardly of the cyclone is connected to a mixer 56.

On the other hand, an outlet piping extending downwardly of a cyclone 57 usable for natural resin is likewise connected to the mixer 56. The outlet side of the mixer 56 is communicated with a raw material feeding port 58 for a molding machine 61.

A receptacle 33 adapted to receive therein discharged material is located below the bottom discharging device 5 of the quantitative feeding apparatus 1 so that it is connected to hoppers 22, 23 and 25 via an ejector mechanism 62 and pipings 73, 74 and 75. A dividing device 66 is interposed between the ejector mechanism 62 and the pipings 73, 74 and 75 so as to allow one of the pipings 73, 74 and 75 to be selected by the dividing device 66. The dividing device 66 is actuated by a pneumatic cylinder 67.

In a case here a normal master batch is used, it suffices that the cyclone 55 is designed to considerably small dimensions. For instance, when the piping 54 has a diameter of 20 mm, it is theoretically possible to achieve separation under such a condition that the cyclone 55 has a diameter of 53 mm and a height of 160 mm. Due to the fact that cleaning is effected inconveniently and inefficiently if it is designed to small, it is practically designed in larger dimensions that those noted above. Separation of the pneumatically conveyed master batch from air may be achieved by employing other means instead of the cyclone. However, when the pneumatically conveyed master batch is introduced directly into the feeding port of the molding machine not via any device in which air is separated from solid material, the master batch is caused to scatter within the interior of the mixer 56 and thereby it fails to be uniformly mixed with material to be molded.

The mixer 56 is such that it has two end parts of which the inner diameter is different from each other. The one end of the mixer 56 having a smaller diameter is connected to the outlet port of the cyclone 55 from which the master batch falls down, while the other end of the same having a larger diameter is communicated with the lower part of the hopper for the molding machine 61.

Figure 3:
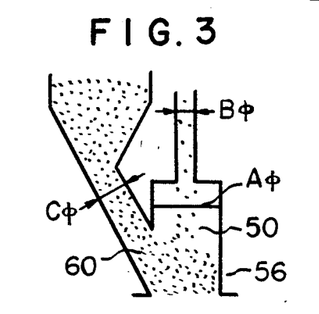
FIG. 3 is a schematic view illustrating movement of pulverized and/or granular material in a mixer.

FIG. 3 is an illustrative drawing schematically showing how pellets move in the mixer 56. The master batch 50 separated by the cyclone 55 falls down on natural resin 60 which moves to be continuously fed into the molding machine 61 whereby the natural resin 60 and the master batch 50 are uniformly mixed together while the master batch 50 moves to the raw material feeding port 58 in the mixer 56. As shown in FIG. 3, when it is assumed that the larger cylindrical diameter of the mixer 56 is identified by A, the smaller one of the same is identified by B and the diameter of the discharging port of the hopper 52 is identified by C, it is necessary that an inequality of $A/B > \frac{1}{4}$ is established in the case where a distribution ratio of master batch to natural resin is represented by 5/100 (by weight) and moreover it is necessary that an inequality of $A/C > 1/5$ is established in the case where the above distribution ratio is represented by 3/100 (by weight). Further, in view of operability of the apparatus, it is preferably that A is dimensioned larger than B.

Figure 4:
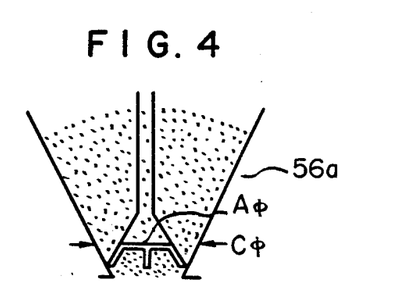
FIG. 4 is a schematic view illustrating movement of pulverized and/or granular material in another mixer.

FIG. 4 shows by way of an example a case where a mixer 56a of which configuration is different from that in FIG. 3 is used. Since the process extending from the storage hopper for the matter batch to the cyclone in this case is identical to that in FIG. 2, any drawing illustrating the process will not required. The mixer 56a is designed in a configuration comprising a connection of cylinder to cone. The upper cylindrical portion of the mixer 56a is connected to the outlet port of the cyclone 55 from which the master batch falls down while it is inserted in the inerior of the hopper for the molding machine, and the other end of the same is fixed to the lower part of the inner surface of the hopper. The master batch 50 which has fallen down in the mixer 56a is mixed with natural resin 60 at an opening and then moves to the raw material feeding port 58. In the case where the mixer 56a is employed, a resultant advantageous effect is that a conventional hopper usually used for a molding machine can be used as it is. When it is assumed that portions shown in FIG. 4 have diameters identified by A and C, the same inequality as the foregoing one is established. However, it is necessary that A is so dimensioned relative to C that a flow of the natural resin to be introduced into the molding machine is not prevented at any rate. Although this related to an amount of resin which can be processed in the molding machine, it practically suffices that a ratio of A to C is approximately equal to $\frac{1}{5}$. In the illustrated case, the lower part of the mixer 56a is designed in a conical shape. Alternatively, it may exhibit a cylindrical shape or a polygonal shape which has the same area as that at the portion identified by a diameter A.

Next, operation of the quantitative feeding apparatus 1 as constructed in the above-described manner will be described below.

A predetermined material is selected from the hoppers 22, 23 and 24 in which different kinds of materials are stored and a predetermined amount of material is supplemented to the quantitative feeding apparatus 1 from one of the supplementing devices 27, 28 and 29 which is in communication with the selected hopper. A weight of the quantitative feeding apparatus 1 is noramlly measured by the weight detector 10, and when a preset lower limit weight is reached, the material is supplemented to the quantitative feeding apparatus 1 by operating one of the supplementing devices 27 to 29 but when a preset upper limit weight is reached, supplementing is interrupted. The material supplemented to the quantitative feeding apparatus 1 in that way is quantitiatively fed from the feeding port 12 by operating the feeder 8. When the kind of material is to be changed to another one after a predetermined amount of material hsa been fed, the bottom discharging device 5 is first opened to discharge therethrough the material still remaining in the interior of the quantitative feeding apparatus 1 and the material remaining at the fore part of the feeder 8 is then discharged by rotating the feeder 8 in the opposite direciton. Thereafter, the supplementing port 3 of the quantitative feeding apparatus 1, the interior of the barrel portion 2, the fore end part of the feeder 8 and the bottom discharging device 5 are cleaned by the cleaning nozzles. In the case where the material has no cohesiveness, the cleaning operation is performed using compressed air discharged through the cleaning nozzles 17, 18 and 21. On the contrary, in a case where the material has a cohesiveness, the cleaing operation is performed using water. In the case of water washing a number of drops of residual water is removed by compressed air after completion of the water washing operation.

After a series of cleaning operations are completed, a different kind of material is selected and quantitative feeding is achieved by repeating the same operations as meantioned above. To assure that the fore part of the feeder 8 is easily cleaned using air or water, it is preferably that feeding of the material is easily achieved under the effect of resilient force of a spring. With respect to the bottom discharing device it is possible to employ a rotary valve or a slide gate. However, in view of easiness of cleaning it is preferable to employ the cut gate system as shown in the drawing.

Next, operation of the multi-colored automatic feeding appartus 51 to which the material is supplied in the form of a master batch will be described below.

A predetermined master batch is selected from master batches stored in the storage tanks 22 to 24 and it is then supplemented to the quantitative feeding apparatus 1 by operating the supplementing device (one of the supplementing devices 27 to 29) which is in communication with the selected hopper. It should be noted that the number of hoppers should not be limited only to that in the illustrated case. A weight of the quantitative feeding apparatus 1 is always measured by means of the weight detector 10. When a preset lower limit weight is detected, the master batch is supplemented to the quantitative feeding apparatus 1 and when an upper limit weight is detected, supplementing is interrupted. In this manner, the master batch delivered to the quantitative feeding apparatus 1 is fed to a molding machine in dependency on the employed kind of the latter in such a manner that it is either continuously fed to an extruder during a period of operation thereof or intermittently fed to an injection molding machine in operative association with the quantitative feeding appartus 1. Thus quantitative feeding is achieved under control of a feeding rate of the feeder 8 on the basis of a decremented rate of feeding of the master batch. The master batch fed to the quantitative feeding apparatus 1 is then introduced into the mixer 56 for both natural resin and master batch via the hopper 52, the pneumatic conveyor 53 and the cyclone 55.

On the other hand, in order to permit color changing to be effected after completion of molding operation, the residual batch is first discharged from the quantitative feeding apparatus 1 by opening the bottom discharging device 5 and a selection is then made with respect to the return pipings 73 to 75 so as to enable a certain master match to return to its associated storage tank therethrough via the ejector mechanism 62 by actuating the distributing device 66.

At the same time, the residual master batch is cleaned by blowing air through the cleaning nozzles 17, 18 and 21 arranged in the vicinity of the supplementing port 3, the feeding port 12 and the bottom discharging device 5 on the barrel 2 of the quantitative feeding apparatus 1. After completion of the cleaning operation, a required master batch is newly selected as that the same operations are repeated to produce the next products.

Next, construction of a runner recycling apparatus having the above-described quantitative feeling apparatus used therefor will be described below with reference to FIG. 5 and 6.

Figure 5:
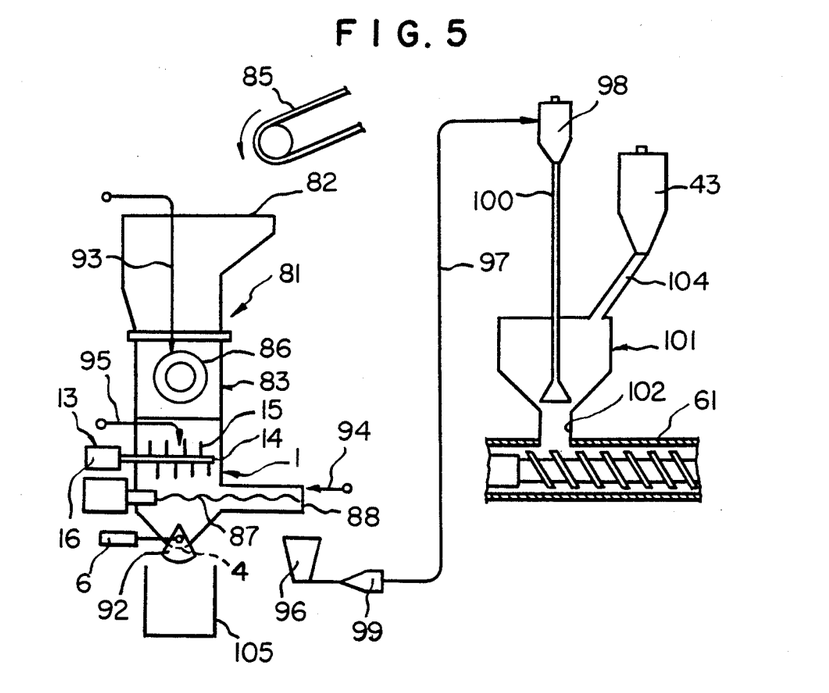
FIG. 5 is a schematic view illustrating a runner recycling apparatus in accordance with an embodiment of the present invention.
Figures 6, 7:
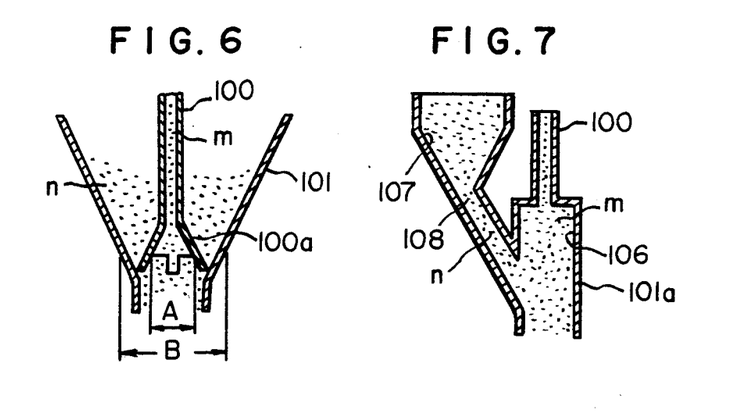
FIG. 6 is a schematic sectional view of a mixer employable for practicing the present invention.
FIG. 7 is a schematic sectional view of a modified mixer.

In FIGS. 5 and 6, reference numeral 81 designates a crushed runner feeding apparatus which includes a feeding chute 82, a crusher 83 and a quantitative feeding apparatus 1 in an integral structure in accordance with the order as viewed from the above. A conveyor 85 is diposed upwardly of the feeding chute 82 so that runners are introduced therefrom into the interior of the feeding chute 82. The crusher 83 located below the feeding chute 82 has a plurality of annularly arranged crushing blades 86 incorporated therein so that the runners introduced into the feeding chute 82 are crushed to a predcetermined size by means of the crushing blades 86 during a period in which they fall down under the effect of natural gravity force generated thereby.

The quantitative feeding apparatus 1 located below the crusher 83 has a feeder 87 incorporated therein so as to allow the runners crushed by the crusher 83 to be delivered quantitatively. The quantitative feeding apparatus 1 is provided with a feeding port 88 at the fore end of the feeder 87 on the bottom side wall thereof and crushed runners are delivered to the outside through the feeding port 88 while their feeding rate is measured. In addition, the quantitative feeding apparatus 1 is equipped with a bridge breaker 13 above the feeder 87. The bridge breaker 13 is such that a plurality of agitating blades 15 are attached to a shaft 14 adapted to be rotationally driven by a motor 16 in order to prevent an occurrence of bridging with crushed runners. Additionally, the quantitative feeding apparatus 1 is formed with a downwardly tapered discharging port 4 at its lowermost end. This discharging port 4 is adpated to open or close by actuating a cut gate type valve 92 which is energized by a cylinder 6. Incidentally, as to the feeder 87 it is possible to employ various types of feeders such as a spring feeder, a screw feeder, a belt feeder, a table feeder, pneumatic feeder or the like but in view of cleanability to be described later it is preferably to employ the spring feeder.

The crushed runner feeding apparatus 81 is provided with a first cleaning nozzle 93 directed toward the crushing blades 86 from the above, a second cleaning nozzle 94 directed toward the feeder 87 and a third cleaning nozzle 95 directed toward the agitating blades 15 for the bridge breaker 13. By ejecting compressed air or pressurized water through the cleaining nozzles 93, 94 and 95, the crushing blades 86, the feeder 87 and the feeding port 88 to each of which crushed runner is liable to adhere can be cleaned in unison.

On the other hand, a hopper 96 is provided below the feeding port 88 in vertical alignment with the latter through which crushed runners are discharged. This hopper 96 is connected to a cyclone 98 via a piping 97 in which an ejector 99 is interposed. The ejector 99 is adapted to function in such a manner that compressed air supplied from a compressor is introduced into the piping 97 so that crushed runners are sucked from the hopper 96 and they are then delivered to the cyclone 98. For instance, an ejector manufactured and sold under a brand name of breath rider by Breath Co., Ltd. is preferably employable. In addition, the cyclone has a function of separating crushed runners from the delivered air serving as conveying medium. In an oridnary crushed runner, it suffices that the cyclone 98 is designed to considerably small dimensions. For instance, in a case where the piping 97 has a diameter of 20 mm, it is theoritically possible to carry out separation under a condition that the cyclone 98 is designed to have a diameter of 53 mm and a length of 160 mm. If it is designed excessively small, cleaning is effected inconveniently. Accordingly, from the viewpoint of practicability, it is designed larger than the above-noted numerals.

A runner feeding pipe 10 extends downwardly of the lower end of the cyclone 98. The lowermost end of the runner feeding pipe 100 is introduced into a mixer 101 disposed above a molding machine 61. The lower part of the mixer 101 is contoured in an inverted conical shape so that is it communicated with the molding machine 61 via a feeding port 102. The runner feeding pipe 100 has a plurality of supporting feet 100a downwardly extending in a funnel-shaped configuration within the mixer 101 so that it is supported on the peripheral wall of the mixer 101 via the supporting feet 100a (see FIG. 6). The mixer 101 is connected to another hopper 43 for new material via a feeding port 104.

Crushed runner m flows down to the feeding port 102 via the runner feeding pipe 100, while new material n flows along the conically inclined surface of the mixer 101 through spaces between the adjacent supporting feet 100a for the runner feeding pipe 100 down to the feeding port 102 at which both materials are united and mixed with each other. Due to a necessity for determining a diameter A of the runner feeding pipe 100 at the open and a diameter B of the mixer 101 in the vicinity of a region where both the materials are united together so as not to prevent the new material from flowing down, it is necessary that an inequality of $A/B > \frac{1}{4}$ is established, for instance, in a case where a ratio of crushed runner to new material n is 5/100. Further, in a case where a ratio of distribution is represented by 3/100, it is necessary that an inequality of $A/B > 1/5$ is established.

Next, operation of the runner recyclinc apparatus will be described below.

Runners produced after completion of injection molding operation are caused to enter the feeding chute 82 from the conveyor 85 under the effect of the force of gravity generated thereby. In the case where molded products need some secondary processing such as gate cutting or the like, separated runners may be manually introduced into the feeding chute 82. The so fed runners becomed crushed runner which has been subjected to crushing by means of the crushing blades 86. Crushed runner is deposited on the bottom of the quantitative feeding apparatus 1 to be received by the feeder 87 and thereafter a predetermined amount of crushed runner is fed to the feeding port 88 by operating the feeder 87 so that it is stored in the hopper 96. The crushed runner which has failed to be fed by the feeder 97 is caused to remain on the bottom of the apparatus. On the other hand, the crushed runner stored in the hopper 96 is delivered via the ejector 99 to the cyclone 98 in which air is separated from the crushed runner which in turn flows through the runner feeding tube 100 down to the mixer 101. Then, in the mixer 101 the crushed runner is mixed with the new material which has flown down from the cyclone 103 and thereafter a mixture is delivered to the molding machine 61.

When it is required that the kind of crushed runner is changed to another one, the discharging port 4 on the lower end of the quantitative feeding apparatus 1 is opened by actuating the valve 92 so that the crushed runner remaining on the bottom falls down into a receiving box 105. Next, by rotating the feeder 87 in the opposite direction, the crushed runner remaining at the fore end part of the feeder 87 is removed therefrom. Next, for instance, compressed air is blown toward the crushing blades 86, the feeder 87 and the agitating blades 15 through the cleaning nozzles 93, 94 and 95 whereby the crushed runner adhered to them is cleaned and it is then received in the box 105 via the discharging port 4. After completion of a series of cleaning operations, the different kind of crushed runner is fed so that a next molding operation is ready to be initiated.

It should be noted that the mixer in which new material and crushed runner are mixed with each other should not be limited only to a specific one parfticularly, in structure. For instance, a mixer 101a as shown in FIG. 7 is available which is so constructed that a feeding port 108 in communication with a hopper 107 for new material is opened on the side wall of a cylindrical portion 106 communicated with the runner feeding pipe 100.

Further, as to the mechanism for opening or closing the discharging port 4 on the lower end of the quantitative feeding apparatus, a rotary valve or a slide gate may be employable in place of the cut gate type valve 92 in the illustrated embodiment.

As will be apparent from the above description, the present invention offers the following advantageous effects.

When the quantitative feeding apparatus as constructed in the above-described manner is used, there is no need of manually disassebling and cleaning the quantitative feeding apparatus when the kind of material is to be changed to another one. Consequently, changing of the kind of material can be easily and quickly achieved merely by so-called button control.

Additionally, there does not arise a problem of contamination of an operator with dust. Accordingly, the working enviornment can be improved.

In the case where a long period of time is required for changing the kind of material to another one, a plurality of quantitative feeding apparatus was heretofore provided to assure that the next production is initiated quickly. In contrast with the prior art, according to the present invention, only a single quantitative feeding apparatus is required with the result that the spaced required for installation can be reduced remarkably and the apparatus can be manufactured at an inexpensive cost.

In addition, when the multi-colored automatic feeding apparatus according to the present invention is employed, there is no need of manually disassembling and cleaning the quantitative feeding apparatus usable for master batch when the kind of color of material is to be changed to another one. By virtue of the fact that there is provided no mechanical mixer, there is no need of cleaning such a mixer. Additionally, since shifting of the master batch in the quantitative feeding apparatus can be easily achieved within a short period of time, changing of the kind of color of the master batch can be completed withou any loss.

Further, according to the present invention, mixing of natural resin with the master batch is not achieved in the form of a batch but it is achieved continuously. Additionally, mixing is effected at the lower part of the hopper. If mixing is achieved in the form of a batch, there is a need of consuming the whole amount of one batch for molding operation. However, according to the present invention, the molding operation can be stopped at any arbitray time, useless molding can be avoided. Sine mixing is continuously effected at the lower part of the hopper for a molding machine, separation of master batch from natural resin does not take place in the hopper and it is possible to perform the molding operation with a stabilized quality even when an amount of batch to be added is less than 3% by weight. Hitherto, the same number of quantitative feeding apparatus operable in the form of a batch as the number of color is provided. However, according to the present invention, only a single quantitative feeding apparatus is provided for changing the kind of colors to another one. Accordingly, the space required for installation can be reduced substantially and moreover the apparatus can be manufactured at an inexpensive cost.

Further, since the runner recycling apparatus according to the present invention is constructed in the above-described manner, cleaning of the interior of each of the components such as a crusher, quantitative feeding apparatus or the like can be achieved merely be ejecting a cleaning fluid through a plurality of nozzles when changing of the kind of material or color to another one is required, resulting in an efficiency relative to the cleaning operation being improved remarkably. Additionally, since there is no need of disassembling for the purpose of cleaning, contamination of an operator with dust does not take place. This leads to improvement of the environment. Further, since mixing of crushed runner with new material is achieved on the molding machine side and pipings arranged in an intermediate region are used merely for the purpose of conveyance, it suffices that not only pipings having a smaller diameter but also blowers designed in smaller dimensions are used. In connection with this, the distance by which the pipings extend can be shortened, resulting in the space required for installation being reduced.

No dust contamination takes place and thereby the environment can be improved. Since the amount of material staying in an intermediate passage leading to the mixer is minimized, loss of material in the event when the kind of color is to be changed or the like situation can be reduced. Further, since a distance as measured from the mixer to the molding machine is shortened, such a problem that separation may take place with mixed material due to a difference in falling speed can be solved satisfactorily. Another advantageous effect is that uniformity among products can be improved with an occurrence of rejection being minimized.

What is claimed is:

1. A master batch type multi-colored automatic feeding apparatus comprising a quantitative feeding apparatus, an amount of master batch to be supplemented to a barrel portion of said quantitative feeding apparatus being automatically controlled by meansuring a predetermined amount of master batch stored in a plurality of master batch storage hoppers, said quantitative feeding apparatus comprising a feeder for mechanically feeding said predetermined amount of master batch from said barrel portion through a feeding portion out of said barrel portion, said master batch type multi-colored automatic feeding apparatus further comprising a pneumatic conveyor for conveying the master batch fed from said feeding portion to a molding machine, a separator disposed above said molding machine to separate air from solid material, a mixer including a raw material feeding portion for said molding machine in which the master batch which has fallen down after completion of separation of air from solid material is mixed with a natural resin, and selecting and returning means for selecting the kind of master batch discharged from a discharging portion on the bottom part of the quantitative feeding apparatus to be returned to the same kind of hopper among said plurality of storage hoppers and then returning it thereto, wherein a supplementing port through which the master batch is supplemented is provided on the upper end of said barrel portion, said feeding portion through which the master batch is fed is provided at an intermediate part of the barrel portion and wherein a plurality of cleaning nozzles are provided for washing said supplementing port, said feeding portion and said discharging portion.

* * * * *